Jan. 1, 1935.  A. R. THOMAS  1,986,231
TRACTOR TRAILER COUPLING
Filed Aug. 7, 1933
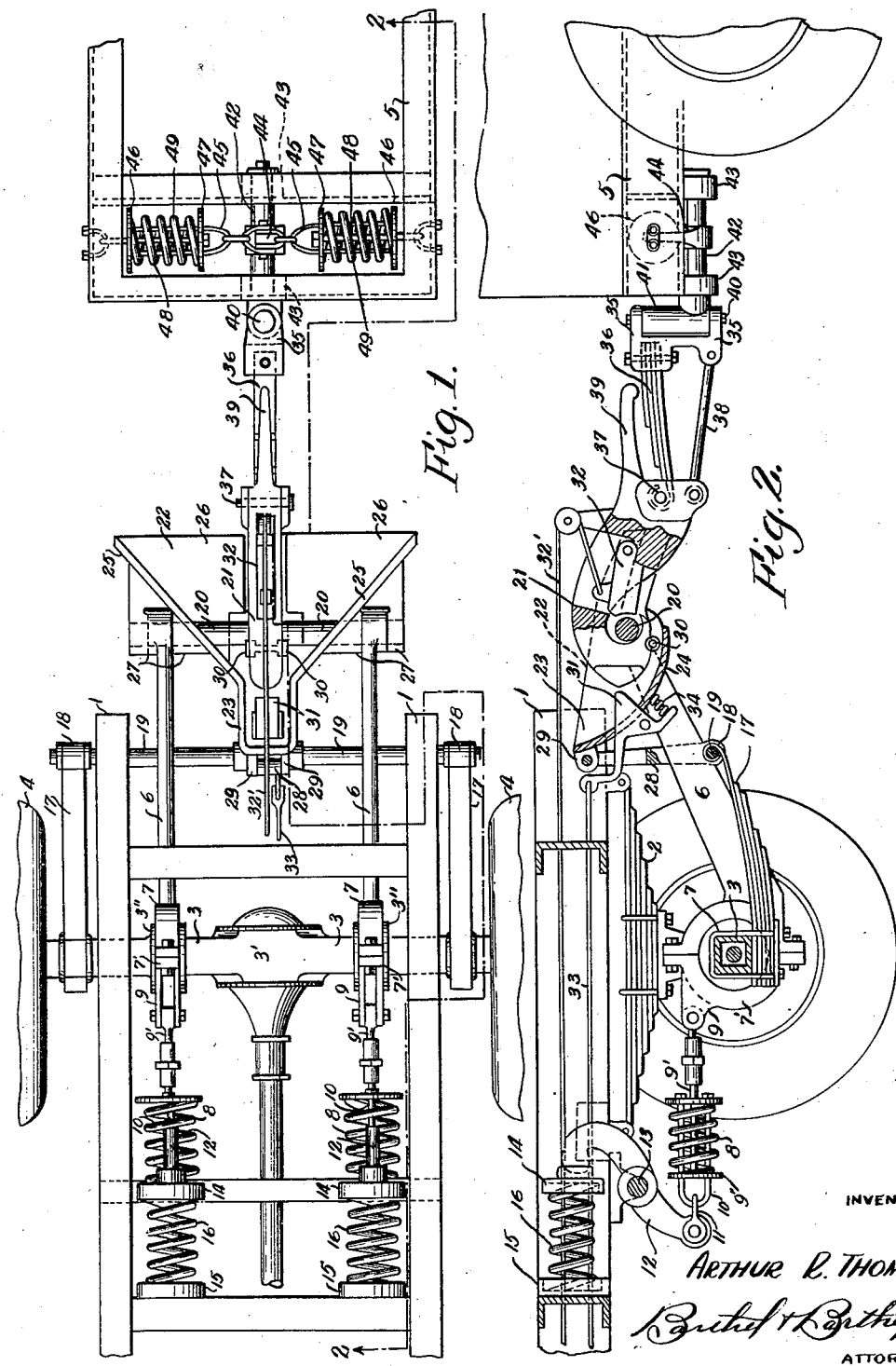
INVENTOR
Arthur R. Thomas
ATTORNEY Patented Jan. 1, 1935

1,986,231

UNITED STATES PATENT OFFICE 1,986,231

TRACTOR TRAILER COUPLING

Arthur R. Thomas, Detroit, Mich.

Application August 7, 1933, Serial No. 683,959

11 Claims. (Cl. 280—33.9)

This invention relates to suitable means for detachably coupling a trailer or other load carrying vehicle, to the rear end of a tractor or other power driven vehicle, and an object of the invention is to provide an arrangement whereby the coupling and uncoupling of said vehicles is facilitated and a strong, compact and efficient connection is secured.

A further object is to embody in such a coupling, yieldable means for yieldably supporting the load of the front end of the trailer, and to provide means for attaching such coupling to the forward end of the trailer, embodying a pivotal connection arranged to swing upon an upwardly extending axis and to turn upon a horizontal, longitudinally extending axis, together with yieldable means on the trailer to resist such turning and thereby tend to maintain the forward end of the trailer in a level position transversely.

It is also an object of the present invention to provide means whereby the load of the forward end of the trailer is transferred by the coupling means to the tractor by means mounted upon the rear axle of the tractor and which means preferably includes cantilever arms pivotally connected to said tractor axle and upon the rear ends of which arms the detachable coupling mechanism is preferably carried, whereby the load of the trailer is transferred and its effect in holding the tractor wheels in contact with the ground is increased in going up a hill.

It is also an object to provide detachable coupling means arranged to firmly interlock, together with instrumentalities for firmly holding the parts in interlocked position, and including means effecting a substantially longitudinally rigid connection between tractor and trailer, whereby the trailer may be backed by the backing up of the tractor without danger of the coupling becoming uncoupled or broken.

Other objects and advantages of the present invention will more fully appear by reference to the accompanying specification and drawing wherein:

Figure 1 is a plan view of a portion of a tractor and trailer coupled by mechanism illustrative of an embodiment of the present invention; and Fig. 2 is a longitudinal side elevation partly in section substantially upon the line 2—2 of Fig. 1.

In the drawing 1 indicates the chassis frame of any suitable tractor or other power driven vehicle, which frame is supported by the usual springs 2 mounted upon the usual rear axle 3 provided with ground wheels 4. 5 indicates the chassis frame of a trailer or other load carrying vehicle, the forward end of which is coupled to the axle 3 of the tractor by means including a pair of cantilever arms 6 each formed at its forward end with a half-ring 7 to which is bolted a cap member 7' to form a complete ring to embrace the said axle at a distance outwardly from the usual differential casing 3' of said axle which axle may be formed with flanges or other formations 3" providing grooves to receive these rings on the forward ends of said arms 6 and prevent movement of said rings and arms longitudinally of the axle while permitting free rotation thereof and downwardly swinging movement of said arms.

To resist such swinging movement of said cantilever arms, springs 8 are connected to ears 9 on the upper part of the members 7' by rods 9' pivotally attached at one end to said ears and at their forward ends to heads or plates 9" slidable upon yokes 10 with said springs 8 interposed between a head or plate on each yoke and said head on each rod, so that said springs will be compressed by a pull upon said rods by a rotative movement of said cantilever arms upon said axle, the forward ends of said yokes 10 being connected by links 11 to the lower ends of S-shaped levers 12 pivotally supported intermediate their ends, as at 13, upon the frame 1 some distance forwardly of the said axle. To resist forward swinging of the upper arm of each lever 12 said ends of said arms abut heads 14, between which heads and sockets 15 secured to the chassis frame 1, are positioned compression springs 16. Therefore the downward swinging movement of the cantilever arms 6 under load on the forward end of the trailer, which trailer is coupled to the rear ends of said arms in a manner hereinafter set forth, is resisted by said springs 8 and 16, and such load force is transferred to the tractor frame to hold its forward end down and prevent the tractor frame from being tilted or swung upwardly and rearwardly upon its rear axle, by the load of the trailer or by resistance of the trailer to forward movement.

To further resist downward swinging of the arms 6 and to transfer some of the load of the forward end of the trailer to the rear axle 3 of the tractor, a half leaf spring 17 is rigidly secured in any suitable manner to the underside of said axle preferably, between each mounting of each arm 6 thereon and each wheel 4, and the rear or free end of each of these leaf springs is formed with an eye 18, these eyes forming bearings for the mounting therein of a transverse shaft 19 extending beneath the arms 6 which rest thereon intermediate their ends.

Mounted rigidly within suitable bearings formed in the rear ends of the arms 6, is a transverse draw-bar 20 adapted to be engaged midway between said arms, by a coupling hook 21 carried by the trailer in a manner hereinafter described. This hook 21 is adapted to be guided into engagement with said draw bar when the tractor is backed toward the trailer to effect a coupling therebetween, by a suitable guide member, indicated as a whole by the numeral 22, said member being formed with a rearwardly open neck portion 23 having a downwardly and rearwardly curved bottom wall 24 and straight side walls which merge into rearwardly diverging flanges 25 having integral inwardly extending and downwardly inclined bottom walls 26 to engage the lower curved side of said hook and lift the same, said side flanges 25 engaging the rounded and tapered nose of the hook to guide the same into the neck portion 23. As the hook slides up one of the inclined bottom walls 26, its nose comes into contact with the draw bar 20 which extends across said guide member 22 just rearwardly of the neck portion 23 thereof, is lifted by said draw bar and drops into said neck so that upon forward movement of the tractor, said hook will be hooked over said bar and automatically couple tractor and trailer.

This guide member 22 is supported in proper position by providing bearings 27 thereon to receive the draw bar 20, a bearing at each side of the end of each arm 6, and to maintain said member in proper rotative position upon said bar a supporting arm 28 is mounted upon the transverse shaft 19 at its lower end and pivotally attached at its upper end to the forward end of the neck portion 23, between ears 29. Rollers 30 are provided on the lower part or nose of the hook 21 to roll upon the bottoms 24 and 26 of the guide member to cause the hook to move readily along these surfaces in coupling and uncoupling, and to facilitate disengagement of the hooks from the draw bar and to hold it against disengagement therefrom latch members 31 and 32 are provided, the latch 31 being pivotally attached to the under side of the wall 24 of the guide member and formed with a nose portion adapted to project through an opening in said wall forwardly of the nose of the hook to form a cam abutment to lift the hook when the tractor is backed toward the trailer, and the latch 32 being pivotally supported at one end within a recess in the hook with its opposite end in position to close the open side of said hook and in opposed relation to the rear side of the draw bar when said hook is engaged therewith. Attached to the latch 31 is a cable 33 by means of which said latch may be swung against the action of a spring 34 out of the path of said hook in coupling, and the latch 32 may be lifted out of the path of the draw bar, in uncoupling, by means of a cable 32'. The hook is thus locked in coupled position and the latch 32 is arranged to take the thrust of the draw-bar in backing up.

In uncoupling, the latch 32 is first lifted to permit relative movement of the hook 21 and draw bar 20, and upon such movement, the nose of the hook comes into contact with the latch 31, which, due to the rearwardly curved lower side of the hook, automatically lifts the hook with a cam action and then springs back beneath the hook to hold it above the horizontal plane of the draw bar so that it will not again hook over said bar when the tractor is moved away from the trailer to withdraw the hook.

In coupling, the hook is lifted and guided into contact with the draw bar by the walls 26 and the latch 31 is swung out of the path of the nose of the hook to permit said hook to drop and hook over the draw bar.

To yieldingly connect the hook 21 to the trailer so that the load of the forward end of the trailer will be yieldingly supported by said hook, a bracket 35 is attached to the trailer as hereinafter described and secured at one end to this bracket to extend forwardly therefrom, is a leaf spring 36 formed with an eye at its forward end for the pivotal attachment of the hook thereto as by a pivot bolt 37 passing through said eye. A link 38 is pivotally attached at its forward end to a portion of said hook body below the pivot 37 and at its opposite end to the lower end of the bracket 35. A tail portion 39 on the hook extends rearwardly over the spring 36 to rest thereon when the forward end of the trailer is under load and thus form a stop for the hook so that the load is yieldingly supported by said spring. This arrangement also permits of a pivotal movement between hook and spring when the tractor drops into a hole in the road, permitting the hook to follow the draw bar. Further this pivoted play between hook and spring facilitates the coupling operation under certain conditions.

The bracket 35 is pivotally supported to turn upon an upwardly extending axis by means of a pin 40 passing through a bore in a head 41 on the outer end of a stem 42 mounted to turn upon a horizontal axis extending longitudinally of the trailer chassis frame 5 within bearings 43 on said frame, and secured upon said stem intermediate said bearings, is an upwardly extending arm 44 to the upper end of which is pivotally attached in any suitable manner, a pair of yokes 45 to the opposite ends of which, heads 46 are secured, and like heads 47 are anchored to the frame by rods 48 with coiled springs 49 interposed between said heads 46 and 47, so that swinging movement of said arm 44 in either direction will be resisted by said springs. Should there be lateral twisting movement of the frame 5 due to the placing of the load or to unevenness of the road, this twist will be resisted by said springs which will always tend to bring the chassis frame to a level position, relieving the frame of these strains and tendency of the chassis to tilt laterally, but at the same time permitting such lateral tilt, and as the hook 21 is attached to the tractor chassis to turn relative thereto upon both the vertical axis of the pin 40 and the longitudinal, horizontal axis of the stem 42, the coupling hook may swing laterally relative to the trailer and follow the course of the tractor in going along curves, and said hook may rotate relative to said trailer upon relative lateral tilting of tractor and trailer, to relieve said hook of undue strains and to permit it to maintain its engagement with the draw bar. With this arrangement a very strong detachable coupling between tractor and trailer is provided, which coupling provides universal action and is yieldingly supported, and may be quickly and conveniently manipulated in coupling and uncoupling tractor and trailer.

Due to the fact that the cantilever arms 6 are mounted at their forward ends upon the rear or driving axle of the tractor for yieldably pivotal movement upon said axle and that the forward end of the trailer is connected to and supported by the rear ends of these arms, the load is transferred by these arms to the axle and its effect multiplied thereby in increasing the traction of the rear or driving wheels of the tractor, and this effect is greatly increased in going up a grade where more traction is needed, due to leverage exerted by said arms.

Obviously changes may be made in the construction and arrangement of parts within the scope of the invention, and I do not, therefore, limit myself to the particular construction shown.

Having thus fully described my invention what I claim is:—

1. The combination with a tractor and a trailer, of coupling means for detachably coupling said tractor to said trailer, including a downwardly open hook connected to said trailer by an upwardly yieldable spring secured at its rear end to a bracket supported to swing relative thereto upon an upwardly extending axis and to turn upon an axis extending longitudinally of said trailer, a transverse draw bar on said tractor adapted to be engaged by said hook, and means carried by said hook to engage the rear side of said draw bar within said hook for detachably holding said hook engaged with said bar.

2. The combination with a tractor and a trailer, of coupling means for detachably coupling said tractor to said trailer, including a downwardly open hook, a transverse draw bar over which said hook is adapted to hook, means for connecting said hook to the forward end of said trailer and embodying yieldable means for yieldingly supporting the load of said trailer upon said hook, and tending to hold said hook yieldingly engaged with said bar, and means extending laterally of the tractor adjacent and rearwardly from each end of said draw bar for guiding said hook into engagement with said draw bar.

3. The combination with a tractor and a trailer, of coupling means for detachably coupling said tractor to said trailer, including a hook, a bracket connected to the forward end of said trailer to turn upon horizontal and upwardly extending axes, a leaf spring secured at one end to said bracket and pivotally connected at its opposite end to said hook, a rearwardly extending tail on said hook positioned to engage said spring and form a stop for said hook, and means on said tractor over which said hook is adapted to engage to couple said tractor and trailer.

4. The combination with a tractor having a rear axle and a trailer; of means for coupling said tractor and trailer including a cantilever arm having an end embracing said axle to turn thereon, a coiled spring connected to said end of said arm above the horizontal plane of said axle and to said tractor forwardly of said axle to resist rotation of said end of said arm upon said axle and downward swinging movement of the rear end of said arm, and means on said trailer to be connected to the rear end of said arm to couple said tractor and trailer.

5. The combination with a tractor having a rear axle and a trailer; of means for coupling said tractor and trailer including a pair of cantilever arms having bearing portions at their forward ends to embrace and turn upon said axle in spaced apart relation with their rear ends extending rearwardly therefrom, a transverse draw bar connecting the said rear ends of said arms, yieldable means to resist downward swinging movement of the rear ends of said arms, and means on said trailer including a downwardly open hook to engage over said draw bar, said yieldable means tending to hold said draw bar in raised position and yieldingly engaged with said hook.

6. The combination as set forth in claim 5 and wherein said means for resisting downward swinging of said arms includes leaf springs rigidly secured at their forward ends to said axle and extending rearwardly therefrom, and a transverse rod connecting the rear end of said springs and extending beneath said arms transversely thereof to support the same.

7. The combination with a tractor having a chassis including a frame and a rear axle and a trailer having a chassis frame; of means for connecting said tractor and the forward end of said trailer frame including a pair of cantilever arms formed at their forward ends to embrace and turn upon said axle with a downward swinging movement at their rear ends, springs connected to the forward ends of said arms to resist turning and downward swinging thereof, levers pivotally attached to said frame of said tractor forwardly of said axle thereof and to one end of which said springs are attached, springs to resist movement of the opposite ends of said levers, a draw bar connecting the rear ends of said cantilever arms, and a hook connected to the forward end of the chassis frame of said trailer to engage over said draw bar and support the load of the forward end of said trailer upon said bar.

8. A structure as characterized in claim 7 and including means carried by said draw bar for guiding said hook into engagement with said bar.

9. The combination with a tractor and a trailer; of coupling means for detachably coupling said trailer to said tractor, said means including a vertically yieldable member secured to said trailer and extending forwardly therefrom, and a coupling member pivotally attached to the forward end of said yieldable member to turn upon a horizontal axis, said coupling member being provided with means for limiting upward pivotal movement of said coupling member relative to said yieldable member.

10. The combination with a tractor and a trailer; of coupling means for detachably coupling said trailer to said tractor, said means including a leaf spring connected at its rear end to said trailer and rigidly held at said end against upward movement and free to yield upwardly at its forward end, and a hook pivotally attached to the forward end of said spring to turn thereon upon a transverse axis, said hook having a rearward extension to engage the upper side of said spring and limit the upward swing of said hook relative to said spring.

11. The combination with a tractor and a trailer; of coupling means for detachably coupling said trailer to said tractor, said means including a toggle comprising a forwardly extending leaf spring rigidly connected at its rear end to a member on said trailer, and a link below said spring pivotally connected at its ends to the ends of said spring, and a hook pivotally attached to said forward end of said toggle to turn relative thereto upon a transverse axis, said hook having a tail portion extending over said spring to engage the upper side thereof upon upward swing of said hook upon its pivotal attachment to said toggle.

ARTHUR R. THOMAS.